US008566326B2

(12) United States Patent
Hu et al.

(10) Patent No.: US 8,566,326 B2
(45) Date of Patent: Oct. 22, 2013

(54) HIGH-PERFORMANCE LOG-BASED PROCESSING

(75) Inventors: Wei Hu, Palo Alto, CA (US); Yunrui Li, Fremont, CA (US); Vinay Srihari, South San Francisco, CA (US); Ramana Yemeni, Cupertino, CA (US)

(73) Assignee: Oracle International Corporation, Redwood Shores, CA (US)

( * ) Notice: Subject to any disclaimer, the term of this patent is extended or adjusted under 35 U.S.C. 154(b) by 2029 days.

(21) Appl. No.: 10/982,135

(22) Filed: Nov. 5, 2004

(65) Prior Publication Data

US 2006/0101033 A1    May 11, 2006

(51) Int. Cl.
*G06F 17/30* (2006.01)
(52) U.S. Cl.
USPC ................... 707/745; 707/746; 707/747
(58) Field of Classification Search
CPC .............................. G06F 17/30; G06F 17/00
USPC .......................... 707/200, 201, 202
See application file for complete search history.

(56) References Cited

U.S. PATENT DOCUMENTS

| | | | |
|---|---|---|---|
| 5,170,480 A * | 12/1992 | Mohan et al. ...................... 1/1 |
| 5,469,562 A * | 11/1995 | Saether ........................... 714/20 |
| 5,481,699 A * | 1/1996 | Saether ........................... 714/15 |
| 5,832,516 A | 11/1998 | Bamford et al. ............... 707/202 |
| 5,845,292 A * | 12/1998 | Bohannon et al. ................ 1/1 |
| 5,864,849 A * | 1/1999 | Bohannon et al. ........... 707/648 |
| 6,374,264 B1 * | 4/2002 | Bohannon et al. ................ 1/1 |
| 6,449,623 B1 * | 9/2002 | Bohannon et al. ................ 1/1 |
| 6,507,853 B2 | 1/2003 | Bamford et al. .............. 707/203 |
| 6,567,827 B2 | 5/2003 | Bamford et al. .............. 707/203 |
| 6,609,136 B2 | 8/2003 | Bamford et al. .............. 707/202 |
| 7,308,456 B2 * | 12/2007 | Friske et al. ..................... 1/1 |
| 7,406,486 B1 | 7/2008 | Kundu et al. |
| 2002/0091718 A1 * | 7/2002 | Bohannon et al. ........... 707/202 |
| 2004/0122842 A1 * | 6/2004 | Friske et al. .................. 707/102 |
| 2006/0101033 A1 * | 5/2006 | Hu et al. ....................... 707/100 |

OTHER PUBLICATIONS

U.S. Appl. No. 10/308,851, filed Dec. 2, 2002.
U.S. Appl. No. 10/308,879, filed Dec. 2, 2002.
U.S. Appl. No. 10/308,924, filed Dec. 2, 2002.
U.S. Appl. No. 10/443,206, filed May 21, 2003.
U.S. Appl. No. 10/449,873, filed May 30, 2003.

(Continued)

*Primary Examiner* — Farhan Syed
(74) *Attorney, Agent, or Firm* — Hickman Palermo Truong Becker Bingham Wong LLP

(57) ABSTRACT

Each of a plurality of Worker processes are allowed to perform any and all of the following tasks involving logged work items: (1) reading a subset of the work items from a log; (2) sequentially ordering work items for corresponding data objects; (3) applying a sequentially ordered set of work items to a corresponding data object; and (4) transmitting a subset of work items to a Worker process running on another database server in a cluster, if necessary. These tasks can be performed concurrently, at will, and as available, by the Worker processes. An improved checkpointing technique eliminates the need for the Worker processes to get to a synchronization point and stop. Instead, a Coordinator process examines the current state of progress of the Worker processes and computes a past point in the sequence of work items at which all work items before that point have been completely processed, and records this point as the checkpoint.

50 Claims, 5 Drawing Sheets

(56) References Cited

OTHER PUBLICATIONS

Carpenter, Larry M., "Data Guard SQL Apply: Back to the Future" Paper 40144, published Sep. 10, 2003, Oracle Corporation, 21 pages.
Carpenter, Larry M. et al., "Getting Under the Hood with Data Guard SQL Apply", Paper 32515, published Feb. 10, 2003, Oracle Corporation, 18 pages.
McElroy, Patricia, "Oracle Streams—Simplifying Information Sharing in Oracle10G", Paper #40208, published Sep. 10, 2003, Oracle Corporation, 11 pages.
Meeks, Joe et al., "Oracle9i Data Guard—Not Your Father's Log Shipping" downloaded Jan. 24, 2005 from http://www.oracle.com/technology/deploy/availability/htdocs/DataGuardRedoShipping.ht . . . , copyright 1999-2005, Oracle Corporation, 6 pages.
To, Lawrence et al., "Oracle Database 10g Best Practices: Data Guard Redo Apply and Media Recovery", Jun. 2004, 15 pages.
McElroy, Patricia et al., "Oracle Database 10g : Oracle Streams", Nov. 2003, 20 pages.
Babb, Andrew et al., "Oracle9i Data Guard: SQL Apply Best Practices", Sep. 2003, 41 pages.
Baird, Cathy et al., "Oracle8i Data Guard: Concepts, Administration, and Installation Guide", Oct. 2001, Chapter 1, pp. 1-1 through 1-20.
Oracle 10g Data Guard downloaded Jan. 24, 2005, http://www.oracle.com/technology/deploy/availability/htdocs/DataGuardOverview.html?_t . . . , copyright 1999-2005, Oracle Corporation, 8 pages.
Carpenter, Larry et al., "Oracle Data Guard Case Study—SQL Apply & WAN: ADT Security Services, Inc.", Dec. 2004, 6 pages.
To, Lawrence, "Oracle 8i Standby Database", Jun. 7, 1999, 34 pages.
Carpenter, Larry M. et al., "Street Proven Techniques for Deploying Data Guard SQL Apply", Nov. 2004, 37 pages.
Beldalkar, Anand et al., "Using Recovery Manager with Oracle Data Guard in Oracle9i", Mar. 2004, 22 pages.

\* cited by examiner

HIGH-PERFORMANCE LOG-BASED PROCESSING

FIELD OF THE INVENTION

The present invention relates generally to log-based processing and, more specifically, to techniques for parallel processing of logs of work items representing ordered operations on data objects.

BACKGROUND OF THE INVENTION

With log-based processing, work needs to be performed based on a description of the work in a set of records that are stored in a log. An example of log-based processing is system recovery processing. In log-based recovery, the log records represent a sequence of work items that are ordered operations on a set of objects. Specifically, the log records may be redo records that represent changes made to data items in a database prior to a system failure. Generally, recovering the system based on the log entails repeating the processing of the logged work items on the objects.

One context in which log-based processing may be performed is for recovery of a database system after a failure or inadvertent termination within the system. In the context of database recovery, the log is a redo log that records changes made during transactions on a set of objects. Some of the changes recorded in the redo log have been committed but not yet flushed to disk at the time of the failure. The set of objects are database objects, such as tables, rows, views, indexes, and the like. Thus, recovering the database system based on the redo log entails reapplying, to the database objects, changes reflected in the work items. Another context for log-based processing is recovery after media loss or persistent (disk) data corruption. This type of recovery typically involves restoring a backup of the data and then applying the log to replay all the changes since the time at which the backup was taken.

Use of redo logs for system recovery is described in U.S. Pat. No. 5,832,516 to Bamford et al., entitled "Caching data in recoverable objects"; U.S. Pat. No. 6,507,853 to Bamford et al., entitled "Recovering data from a failed cache using recovery logs of caches that updated the data"; U.S. Pat. No. 6,609,136 to Bamford et al., entitled "Recovering data from a failed cache using a surviving cache"; U.S. Pat. No. 6,507,853 to Bamford et al., entitled "Recovering data from a failed cache using recovery logs of caches that updated the data"; the contents of all of which are incorporated by reference in their entirety for all purposes as if fully set forth herein.

Log-based processing is not always in the context of system recovery. Rather, log-based processing may also be performed to repeat logged work on another system. For example, log-based processing may be performed to construct and maintain a standby database system. Approaches to constructing standby databases and processing redo records are described in U.S. patent application Ser. No. 10/308,851 filed on Dec. 2, 2002 by Subramaniam, entitled "Replicating DDL Changes Using Streams"; U.S. patent application Ser. No. 10/308,879 filed on Dec. 2, 2002 by Arora et al., entitled "In Memory Streaming With Disk Backup and Recovery of Messages Captured From a Database Redo Stream"; U.S. patent application Ser. No. 10/308,924 filed on Dec. 2, 2002 by Souder et al., entitled "Asynchronous Information Sharing System"; U.S. patent application Ser. No. 10/443,206 filed on May 21, 2003 by Jain et al., entitled "Buffered Message Queue Architecture for Database Management Systems"; U.S. patent application Ser. No. 10/449,873 filed on May 30, 2003 by Lu et al., entitled "Utilizing Rules in a Distributed Information Sharing System"; the contents of all of which are incorporated by this reference in their entirety for all purposes as if fully set forth herein.

Typical approaches to log-based processing fall into two main categories. The first category involves serial schemes. With serial schemes, a single recovery process reads through the sequence of work items in the log and performs the work on the objects, one work item at a time. In large-scale systems with abundant resources, such a scheme does not take advantage of the available resources and leads to under-utilization of the system resources. For example, when there are multiple CPUs in the system, the recovery process runs in only one of the CPUs and the other CPUs are not utilized. Furthermore, serial schemes are not able to effectively overlap the CPU and I/O components of recovery processing.

The second category of log-based processing involves parallel schemes. With parallel schemes, multiple processes work together in parallel to perform log-based recovery. However, such schemes typically allocate specific tasks to named processes, thus limiting the flexibility of the entire architecture. In particular, a single process acts as the Coordinator for the log processing session. The Coordinator is assigned the task of reading through the entire sequence of work items and assigning the work to be performed to other processes known as Worker processes. Because there are no ordering constraints with respect to work processing that need to be honored across any two different objects, the entire work represented in the log is partitioned by the Coordinator, based on the objects on which the work needs to be performed, prior to assigning partitions of work to the Worker processes.

In situations in which the number of objects is much larger than the number of Worker processes (typically the case in many systems), each Worker process can be assigned a subset of the objects to work on. The Coordinator process directs all the work corresponding to an object to the Worker process that handles the subset of objects in which this object belongs. The Worker process can then process work on its objects in the order in which it receives work items from the Coordinator, thus honoring a total-ordering constraint for work processing on any given object. However, even though the work processing is handled by a set of processes in parallel, there is significant under-utilization of system resources. For example, the Coordinator process often becomes the bottleneck as it struggles to identify and extract work from the log and to assign the work to a large number of relatively idle Worker processes. Furthermore, parallel schemes typically utilize specialized Worker processes that either perform only CPU-based operations or only IO operations.

The Coordinator process is responsible for synchronization tasks, including the need to periodically "checkpoint" the work being performed. During log-based processing, the processing of work items needs to be periodically checkpointed in order to minimize lost work upon resumption of processing after a failure of the original processing session. Processing is checkpointed by identifying and storing a common point, in the processing of the log, which all processes have reached. With such synchronization checkpoints, the Coordinator process identifies a common point in the set of work items for the various objects, and ensures that all Worker processes complete work up to that point. That is, all log processing is completed for all the work items up to that point in the set of work items, and no work is performed on any work items beyond that point in the set of work items.

Once all the processes reach the checkpoint, the Coordinator process takes appropriate action, such as saving the state of the objects, and resumes the processing of the work item via the Worker processes. This approach to handling points of synchronization leads to significant resource underutilization because the Worker processes that are finished with their work ahead of other Worker processes, i.e., the processes that reach the juncture before the other processes, cannot continue processing more work items until every process has reached the point of synchronization.

One approach to using checkpoints in managing shared resources is described in U.S. Pat. No. 6,567,827 to Bamford et al., entitled "Using a checkpoint to manage data that is shared by a plurality of nodes"; the contents of which is incorporated by reference in its entirety for all purposes as if fully set forth herein.

Parallel schemes for log-based recovery are unable to fully utilize global system resources (particularly in configurations involving distributed clusters of CPUs and memory units) because critical-path coordination work remains centralized in a single Coordinator process and, consequently, in a single node of the distributed cluster.

Based on the foregoing, there is room for improvement in the performance characteristics of log-based processing.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION OF EMBODIMENTS OF THE INVENTION

Figure 1:
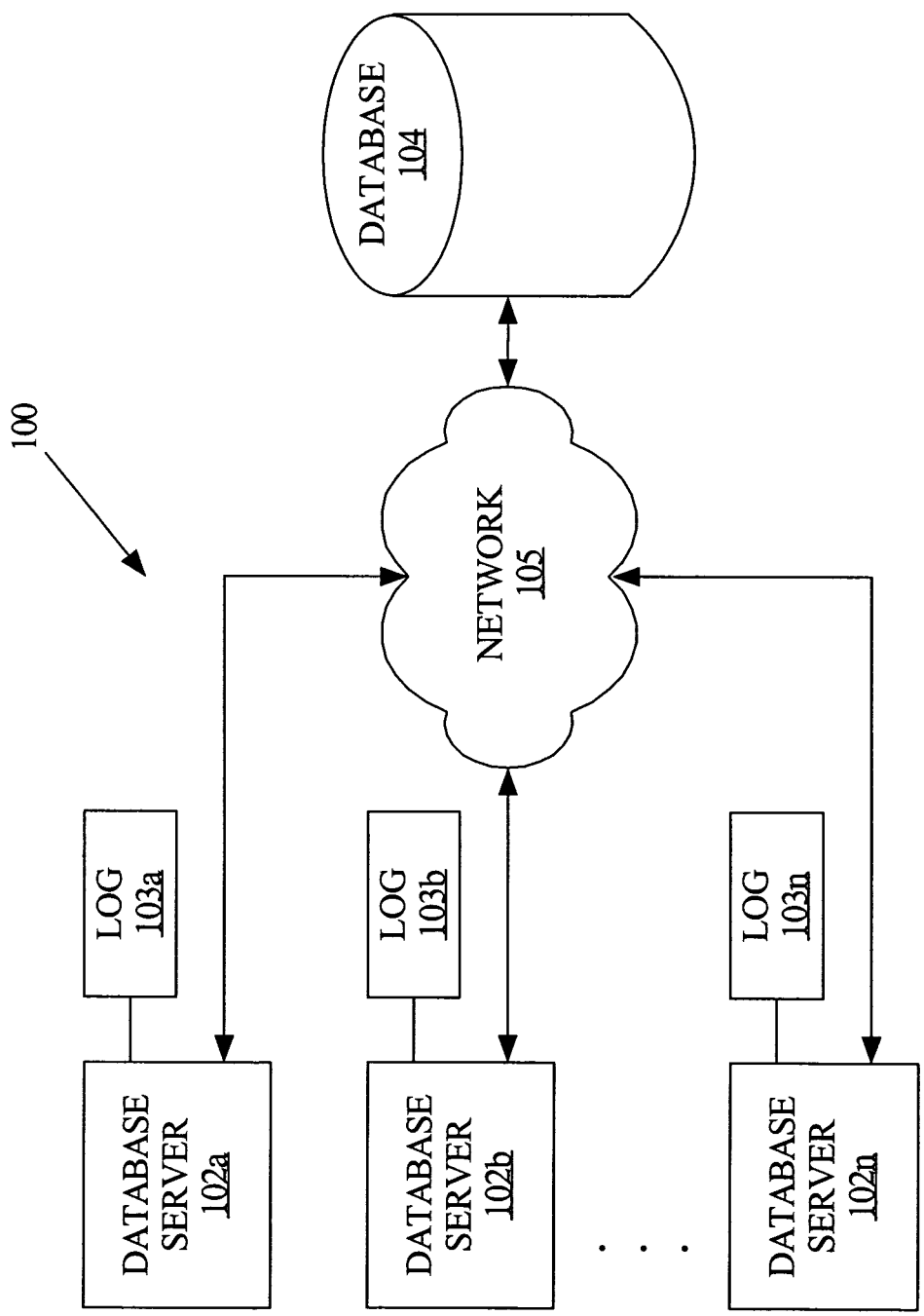
FIG. 1 is a block diagram that illustrates an operating environment in which an embodiment of the invention may be implemented.

In the following description, for the purposes of explanation, numerous specific details are set forth in order to provide a thorough understanding of embodiments of the invention. It will be apparent, however, that embodiments of the invention may be practiced without these specific details. In other instances, well-known structures and devices are shown in block diagram form in order to avoid unnecessarily obscuring embodiments of the invention.

Functional Overview of Embodiments

Embodiments of the invention provide enhanced performance with log-based processing, by allowing each of a plurality of Worker processes to perform any and all of the following tasks involving logged work items that are each associated with a particular data object or data block: (1) reading a subset of the work items from a log; (2) sequentially ordering work items for corresponding data objects; (3) applying a sequentially ordered set of work items to a corresponding data object; and (4) in some scenarios, such as with database clusters, transmitting a subset of the work items to a Worker process running on another clustered database server instance. These tasks can be performed concurrently, as available and at will, by the Worker processes.

In general, there is much less synchronization and coordination required of the Coordinator process and much less idle time for the Worker processes, than with other approaches. Consequently, the Coordinator process workload is significantly smaller, compared with previous approaches involving Coordinator processes that read the work items from the log, order the work items for corresponding data objects and send these sequences of work items to the Worker processes that actually apply changes to the data objects. Therefore, the Coordinator process ceases to be a bottleneck in parallel processing frameworks, leading to better degrees of scalability. In addition, the Worker processes are free to move from task to task at will, which results in significantly better utilization of resources and improved performance for log-based processing.

An improved checkpointing technique further reduces the burdens of synchronization in parallel work processing by eliminating the need for the Coordinator process to (1) identify a future point of synchronization in the sequence of work items and (2) require the Worker processes to get to that point and stop, as with other approaches. Instead, in one embodiment, the Coordinator process examines the current state of progress of the Worker processes and computes a past point in the sequence of work items at which all work items before that point have been completely processed, and records this point as the checkpoint. Hence, the Coordinator process does not require any Worker process to stop working and wait until all other Worker processes reach a predetermined point of synchronization. Again, a higher degree of resource utilization is achieved as Worker processes continue to perform without stopping for checkpoint synchronization.

Operating Environment

FIG. 1 is a block diagram that illustrates an operating environment in which an embodiment of the invention may be implemented. FIG. 1 depicts a multi-node database system 100 that includes multiple database servers 102a-102n (i.e., instances of a database server, which are at times referred to as "server instances," or "clustered server instances" when configured in a database cluster) that are communicatively interconnected to one another via a network 105. Each of these database servers 102a-102n is communicatively coupled to a database 104. In the process of managing data in database 104, each of these database servers 102a-102n generates a respective log 103a-103n, such as a redo log.

Embodiments of the invention are not limited to use in a multi-node system as illustrated in FIG. 1. Rather, the techniques described herein are applicable to single node systems as well. In addition, embodiments of the invention are not limited to use in a database system 100 as illustrated in FIG. 1. Rather, the techniques described herein are applicable to other systems in which log-based processing is performed, such as operating systems for computer systems (e.g., computer system 400 of FIG. 4) and data storage systems (e.g., systems that manage storage disks or volumes, storage area networks, and the like).

The example operating environment 100 includes database servers 102a-102n and a database 104. Each database server ("server") 102a-102n comprises a combination of integrated software components and an allocation of computational resources (such as memory and processes) for executing the integrated software components on one or more processors, where the combination of the software and computational resources are used to manage a particular database on behalf of clients of the server. Among other functions of database management, a database server governs and facilitates access to a particular database, such as database 104, by processing requests by clients to access the database. Each database server 102a-102n operates to parse, interpret and manage execution of database statements, e.g., SQL queries, on database 104.

When configured together in a clustered database, each database server 102a-102n (which may be referred to as a "clustered database instance") is communicatively interconnected via network 105 to the other servers in the cluster, to operate on shared resources persistently stored in database 104. Each shared resource is typically mastered by one of the servers 102a-102n. The master of a resource has access to the data structures associated with the resource, including distributed lock management information for the resource, and manages access to the resource by other servers.

Database 104 is communicatively coupled to servers 102a-102n via network 105 and is a repository for storing data and metadata on a persistent memory mechanism, such as a set of hard disks. Such data and metadata may be stored in database 104 logically, for example, according to relational schema, multidimensional schema, or a combination of relational and multidimensional schema.

During a client session with database 104, through any one of database servers 102a-102n, transactions can be performed on resources from database 104. As part of the management of the resources, each server 102a-102n maintains a log 103a-103n to track the evolution of the resources by recording information that describes the changes made to the resources via the transactions. For example, redo logs and undo logs are maintained by the servers 102a-102n to be used when transactions need to be reconstructed or undone, such as when one or more servers fail or when a standby database is being constructed or maintained. Redo logs are typically used to track changes made to resources, which are committed by a database server but not yet persistently stored in the database 104. At some point, logs 103a-103n are stored persistently in database 104. In a shared-disk system, servers 102a-102n have access to the logs stored in persistent memory, for use in performing log-based processing as described herein.

Database Redo Log Processing

The techniques described herein are described in reference to processing redo logs by one or more database servers 102a-102n. For non-limiting examples, redo logs may be processed (1) as part of a recovery operation in response to a failure of one or more of the servers 102a-102n, (2) in the context of constructing and/or maintaining a standby database that mirrors database 104, and (3) as part of a recovery operation in response to media loss or corruption.

In general, processing a partially ordered log of work items involves at least the following three operations: (1) reading the log entries; (2) for each data object, ordering the log entries in a sequence in which the work items were initially performed on the data object; and (3) applying the work items to the data object to bring the data object to a state that reflects the changes recorded in the redo log. In one implementation, a data object with which logged work items are associated is at the level of a data block. Data blocks have a unique ID, which identifies the file number and block number of the data blocks.

Embodiments of the invention involve a parallel processing scheme in which a high degree of resource utilization is obtained. Using the described techniques, much of the work that is performed in prior approaches by a Coordinator process, is distributed to Worker processes that are executing in parallel. In particular, the Coordinator is relieved of the task of reading the sequence of work items, identifying and collecting the relevant work items for each Worker process and sending the collected streams of work items to the corresponding Worker processes. Instead, each of a plurality of Worker processes perform any or all of the tasks involved with processing logged work items that each correspond to a particular data object or data block. Such tasks may include, for example, (1) reading a subset of the work items from a log; (2) sequentially ordering work items for corresponding data objects; (3) applying a sequentially ordered set of work items to a corresponding data object; and (4) in some scenarios, such as with database clusters, transmitting a subset of the work items to a Worker process running on another clustered database server instance.

However, in certain system configurations, some of the Worker processes may not perform some of the tasks. For example, in certain cluster configurations and with certain hardware settings, it may not be optimal for certain Worker processes to read and/or order logs. Hence, these Worker processes may not read logs and/or order them, rather, these processes just apply changes to subsets of data blocks.

Each of these tasks can be performed at will by the Worker processes, when the overall operation is at a suitable point. For example, work items need to undergo the first task of processing before those work items can undergo the second, third or fourth tasks of processing. However, at any point in time, if a given Worker process is unable to perform any of the four tasks, then the Worker process can use its resources to perform another of the four tasks. Hence, symmetry in the work done by each Worker process is the key to ensuring that no one process will significantly delay any other process from performing some work. The presence of a single point of bottleneck, i.e., the Coordinator process, is effectively eliminated. There is no need to wait for a Coordinator process to read the entire log and/or for the Coordinator to pre-partition the log to facilitate farming out portions of the log to the various Worker processes. In general, there is much less idle time for the Worker processes, than with past approaches.

Figure 2:
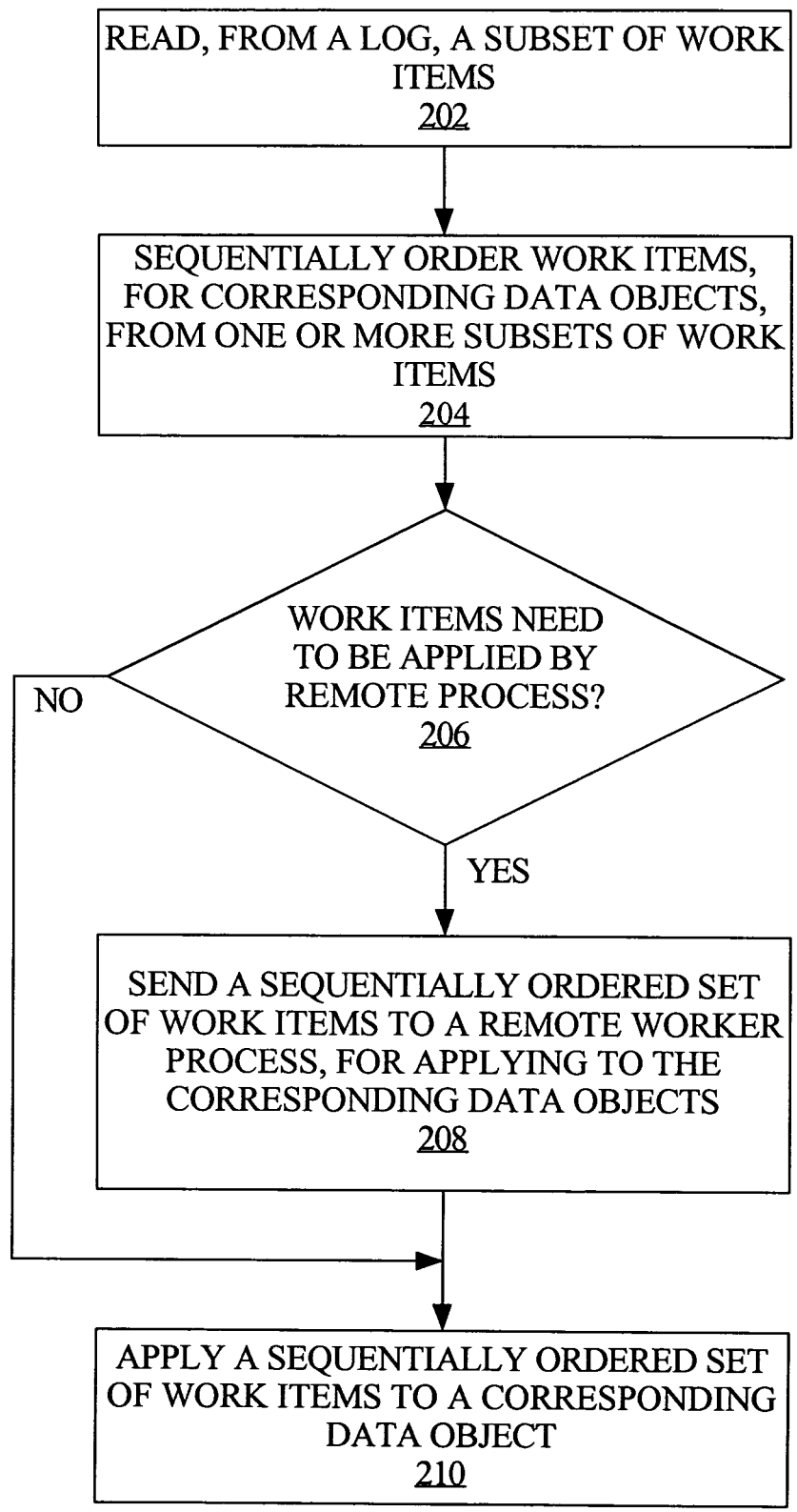
FIG. 2 is a flow diagram that illustrates a method for processing a sequence of work items from a log, according to an embodiment of the invention.

FIG. 2 is a flow diagram that illustrates a method for processing a sequence of work items from a log, according to an embodiment of the invention, where each work item corresponds to a particular data object. Each of blocks 202-206 is performed by each of a plurality of Worker processes. Furthermore, blocks 202-206 can be performed by more than one Worker process at a point in time, and one Worker process can perform one of blocks 202-206 while another Worker process is performing a different one of blocks 202-206. Still further, not all of the Worker processes that are participating in processing the log(s) necessarily perform each of the tasks of blocks 202-206. Furthermore, while the flow diagram of FIG. 2 may visually imply that the processing of the four tasks are done serially, i.e., first read at block 202, then order at block 204, then possibly send at block 208, and then apply at block 210, this is not the manner in which the processing is necessarily performed by any given Worker process. Rather, each of the Worker processes can switch from any task to any task at any time that a task is ready to be performed.

Figure 3A:
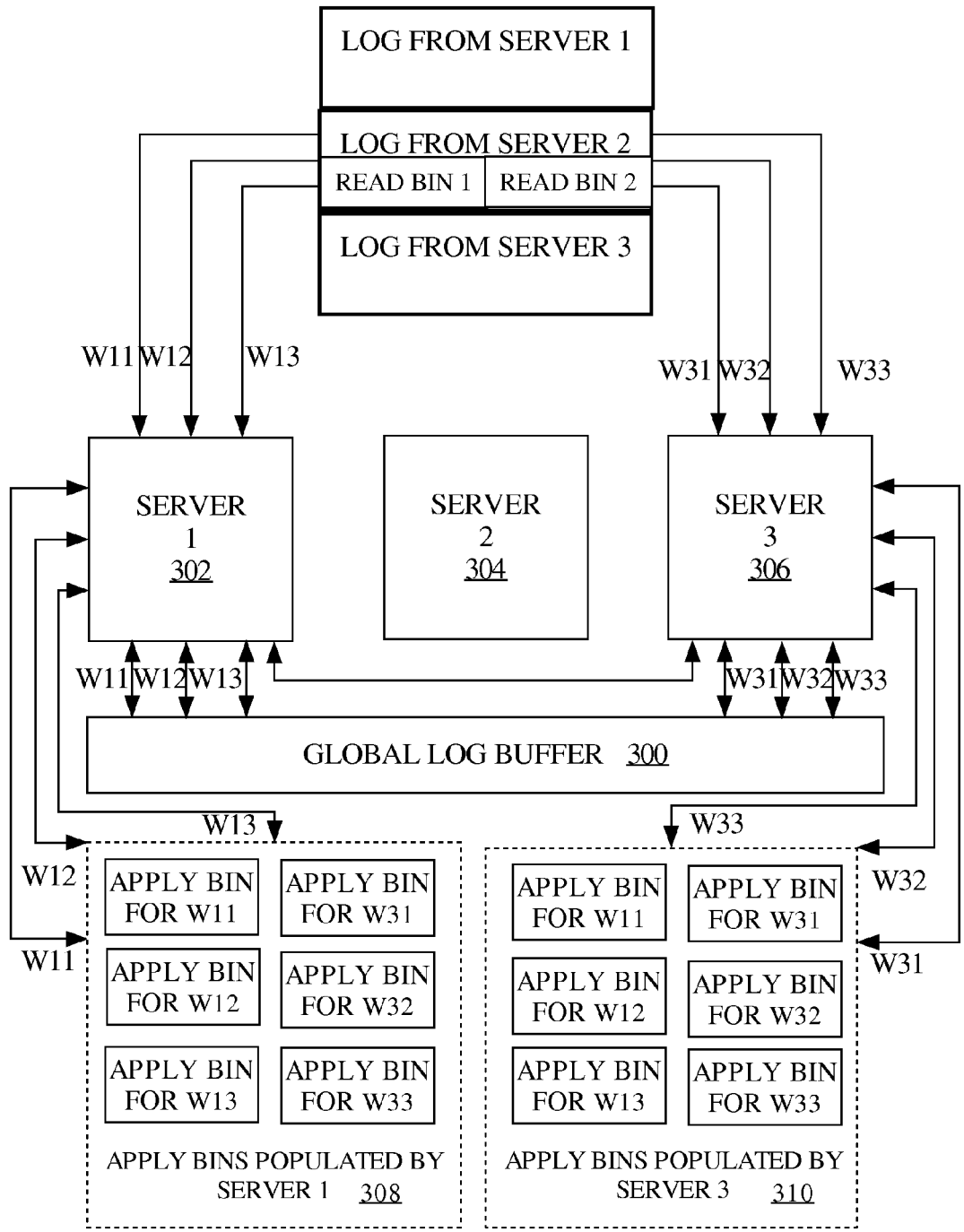
FIG. 3A is a block diagram that illustrates a system performing a method for processing sequences of work items from logs, according to an embodiment of the invention.

FIG. 3A is a block diagram that illustrates a system performing a method for processing sequences of work items from logs, according to an embodiment of the invention. FIG. 3A is referenced to assist in describing the method illustrated in FIG. 2.

With reference to FIG. 3A, a database cluster includes three servers that each generates a log for data transactions that are executed by each respective server. Depicting three servers is arbitrary, for purposes of explanation, and does not limit embodiments to use with three servers only. Assume that server 2 (304) fails before persistently storing all of the resources, e.g., data objects, on which server 2 has committed changes. Further assume that server 1 (302) and server 3 (306) are performing a recovery operation based on the log from server 2, to change those resources to reflect those committed changes made by server 2 that have not yet been persistently reflected for the associated resources. Depicting the failure of server 2 is arbitrary, for purposes of explanation, and does not limit embodiments to use with a single server failure only. Rather, the techniques described herein are applicable to a multi-server failure, as well as applicable to a standby database construction process in which multiple logs are processed, e.g., logs from each of the servers in the system.

Partial Ordering of Log Files

A log may consist of sequences of work items corresponding to data objects from multiple threads of execution in a given server (e.g., multiple sessions with the server) and, therefore, the work items are not necessarily in sequential order for any data object. For example, one thread may record in the log a work item related to a first object, while another thread next records in the log a work item related to a different second object, while yet another thread records in the log a different work item related to the same first object. Similarly, in the scenario in which logs from multiple servers are processed, the sequences of work items across the logs are not in sequential order for the data objects because threads from each of the multiple servers may record work items, in their respective logs, that relate to the same object.

The notion of partial order of work items on data objects has two aspects. First, in the case of a single physical log file, the sequence of work items is partially ordered with respect to the set of data objects referred to by the work items. The "partial" concept refers to the idea that a work item does not have to strictly follow its predecessor work item and does not have to strictly precede its follower work item. So, there is no total order of work items in the log. However, there are certain order constraints, such as a work item on a particular data object must follow another work item on the same data object that appears earlier in the log. In other words, application of the log onto any particular data object does define a total order.

The second aspect of "partial" order is relevant to the context of having a set of multiple logs. That is, each log is a sequence of work items. Hence, with respect to a particular data object, the sequence of work items for that data object cannot be gleaned from reading just one log. Therefore, the entire set of sequences of work items for that data object must be considered. That is, a sequence from each of the logs is merged to arrive at the total order of work items for that data object.

Parallel Read of Logs

At block 202, a subset of work items is read from a log. For example, any or all of Worker processes W11, W12 and W13 of server 1 and any or all of Worker processes W31, W32 and W33 of server 3 read the log of server 2. The log of server 2 may be accessed, for example, from persistent storage. Each of a plurality of Worker processes from each of server 1 and server 3 is assigned to read a different portion of the log file from server 2, i.e., a different series of work items. For example, if there are a total of eight Worker processes, with four Worker processes on each of two servers (e.g., two physical nodes executing database management server instances), and the work items are manifested in the log as two series of work items (each series of work items is referred to hereafter as a "read bin"), then the read operation is partitioned so that all four Worker processes on one server are collectively responsible for reading from one read bin (e.g., read bin 1 of FIG. 3A) and the other four Worker processes on the other server are responsible for reading the other read bin (e.g., read bin 2 of FIG. 3A). On each server, the read operation is not further partitioned. Whichever Worker process has the CPU resource to read the next chunk from the read bin will read it.

The number of work items (i.e., records) read by the servers during each read operation may be based on, for example, criteria related to an efficient IO size for the relevant hardware resources rather than some other criteria imposed by the Coordinator process and requiring partitioning of the work items based on the objects on which the work items need to be applied. Because each of the Worker processes concurrently reads a different portion of the log file, a Coordinator process does not need to partition the work items based on the associated objects to which the work items apply, before the Worker processes read the work items directly from the log. Further, the Coordinator process does not need to read each record and provide them to the Worker processes.

In one embodiment, the log(s) are read multiple times. That is, a set of Worker processes that are responsible for applying changes to a set of data blocks can read the entire log(s) and process the work items on those data blocks, while the rest of the Worker processes that are responsible for the rest of the data blocks may also read the entire log(s) and process the corresponding work on the rest of the data blocks.

Global Log Buffer

In one embodiment, the Worker processes store the information read from the log read bins in a global log buffer 300, which is accessible to server 1 and server 3. This type of implementation is based on a system having cross-machine coherent shared memory, such as a clustered cache fusion enabled system. Any of the Worker processes of server 1 and server 3 can work on reading work items from the log even if some other process is already working on ordering the work items for the data objects or applying work items to data objects, because the Worker processes are free to utilize their resources without concern for synchronization with other processes imposed by a Coordinator.

In an alternative embodiment, the global log buffer is only global within a machine, or server. Hence, Worker processes within the same machine can always access the machine's global log buffer. However, Worker processes within a given machine cannot access the log buffer in another machine. Therefore, work items may need to be shipped from Worker processes on one machine to the Worker processes on remote machines that are to apply those work items.

In another alternative embodiment, in a shared-disk cluster, ordered work items are stored on, and subsequently read from, a "global log buffer" in persistent storage rather than in-memory log buffers. The "global log buffer" in persistent storage is where the ordered work items are temporarily stored so that they are retrievable by other Worker processes for application to respective server instances.

Ordering Work Items

Because log files are only partially ordered for the set of objects to which the work items apply, work needs to be performed to order the work items for each corresponding data object. At block 204 an ordering operation is performed in which the work items are sequentially ordered for each of the corresponding data objects. The ordering operation involves accessing the work items from the global log buffer 300, which contains work items that were read from the log by participating Worker processes on participating servers. Any of the Worker processes W11, W12, W13 of server 1 and W31, W32, W33 of server 3 can work on the ordering operation, even if some of the other processes are still reading from the log or applying work items to data objects. A Worker process that performs ordering operations can order work items that the Worker process itself read from the log, or that other Worker processes read from the log. A Worker process does not have to wait on other processes to complete one stage of processing before being able to work on a subsequent stage of processing. The workload is self-balancing by allowing each Worker process to work in parallel and on whatever stage of processing is currently available and on whatever stage may need help to keep the overall processing moving forward.

For each data object that corresponds to a work item from the log being processed, the work items are sequentially ordered based on, for example, a system change number (SCN) that is associated with a transaction. SCNs are values (e.g., system timestamps) that represent when work items have occurred relative to other work items. Therefore, SCNs, or similarly functioning mechanisms, can be used to sequentially order the work items based on their relative time of occurrence.

Assigning Ordered Work Items to Bins

During log-based processing, data objects are assigned evenly to the different Worker processes, for application of the work items to the corresponding data objects. That is, applying a work item to the data object associated with the work item is performed by the Worker process to which the data object is assigned, or partitioned. There is no requirement regarding how the data objects are assigned to the applying Worker processes. It is advantageous, however, to partition the objects evenly across the applying Worker processes. This assignment of data objects to particular Worker processes is only for the apply operation involving the corresponding work items.

As part of the ordering operation of block 204, Worker processes "place" work items for a data object in sequential order in "apply bins" that correspond to the Worker process that has been assigned to apply those work items to the corresponding data objects. For example, referring to FIG. 3A, Worker processes W11, W12 and W13 from server 1 may sequentially sort work items for a set of one or more data objects that Worker processes on server 1 and server 3 are assigned to apply.

Worker processes from server 1 place sequentially ordered work items that are to be applied by Worker processes on server 1 in bins that correspond to the particular applying Worker process on server 1. Refer to apply bins for W11, W12, W13 in "apply bins populated by server 1" 308 in FIG. 3A. Similarly, Worker processes from server 1 place sequentially ordered work items that are to be applied by Worker processes of server 3 in bins that correspond to the particular applying Worker process on server 3. Refer to apply bins for W31, W32, W33 in "apply bins populated by server 1" 308 in FIG. 3A.

Likewise, Worker processes from server 3 place sequentially ordered work items that are to be applied by Worker processes on server 1 in bins that correspond to the particular applying Worker process on server 1. Refer to apply bins for W11, W12, W13 in "apply bins populated by server 3" 310 in FIG. 3A. Similarly, Worker processes from server 3 place sequentially ordered work items that are to be applied by Worker processes of server 3 in bins that correspond to the particular applying Worker process on server 3. Refer to apply bins for W31, W32, W33 in "apply bins populated by server 3" 300 in FIG. 3A.

Therefore, each apply bin holds a set of work items that correspond to a set of data objects, and which are to be applied by the particular Worker process to which the bin corresponds. Hence, the corresponding work items can be applied to these data objects without coordination or synchronization with other Worker processes. Furthermore, each apply bin contains all of the work items corresponding to the set of data objects corresponding to the apply bin, which were ordered by the Worker processes on the particular server that populates that apply bin. In one embodiment, the work items are not actually stored in the apply bins, rather references (e.g., pointers) to work items in the global log buffer 300 are stored in or associated with the apply bins. In one embodiment, the information associated with the apply bins is in a different buffer than the global log buffer 300.

Sending Bins to Remote Servers for Applying Work Items

At decision block 206, it is determined whether or not any of the work items that were sequentially ordered at block 204 need to be applied by a remote Worker process. For example, the work items in apply bins for W31, W32, W33 in "apply bins populated by server 1" 308 (FIG. 3A) are assigned to be applied by remote Worker processes on server 3 and, therefore, need to be sent to the remote server (server 3), at block 208. Similarly, the work items in apply bins for W11, W12, W13 in "apply bins populated by server 3" 310 (FIG. 3A) are assigned to be applied by remote Worker processes on server 1 and, therefore, need to be sent to the remote server (server 1), at block 208. A Worker process that performs sending operations can send work items that the Worker process itself read from the log or placed in order, or that one or more other Worker processes read from the log and/or ordered.

In an embodiment in which the global log buffer is global across the system servers (as depicted in FIG. 3A), such as with cross-machine coherent shared memory, references to the work items can be shipped to remote Worker processes rather than shipping the work item itself. In an embodiment, in which the global log buffer is global only within a machine, the work item itself is sent to a remote Worker process because the remote Worker process does not have access to the global log buffer of a different machine.

In the scenario in which an apply bin of ordered work items is sent to a remote process, a second merge and ordering operation may be performed by the remote Worker process if the remote Worker process receives separate apply bins from different servers, in order to sequentially order the work items from the multiple apply bins for the corresponding data objects.

Applying Work Items to Objects

At block 210, a sequentially ordered set of work items are applied to a corresponding data object. If at decision block 206 it is determined that none of the work items need to be applied by a remote Worker process, then sending apply bins to a remote process is unnecessary and execution moves directly to block 210, rather than to block 210 through block 208. Applying the work items generally involves making the changes that are represented by the work items to the corresponding data objects. For example, in the context of database recovery, the transactions that were committed on objects but were not stored to disk (i.e., the work items in a redo log) are now applied to whatever version of the data objects is appropriate, according to a conventional recovery process. For another example, in the context of standby database construction, the changes that were committed on objects in a primary database are now applied to the standby or secondary database.

Work items are applied to a given object in sequential order, but can be applied to different objects in any order. Furthermore, in some scenarios, work items can be applied to different objects without any concern for ordering when there are not multiple changes made to the same object. The Worker process can proceed with applying a change to a data object if the Worker process is sure that it has received and applied all of the prior changes to that data object. The Worker process knows this fact when it has received the changes up to a point in the log that is beyond the change being considered for application. This allows Worker processes to be flexible in their processing.

Optimization of Apply Process

In one embodiment, the work items are applied to corresponding data objects in order at the data block level. When applying work items to data objects, the data objects need to be read from persistent storage into memory that is local to the applying process (e.g., a buffer cache), where the changes represented by the work items are applied. In one embodiment, the work items that are not yet applied and for which the corresponding data objects are not yet in local memory, are cached local to the applying process. For example, the work items can be associated with the buffer that is pending IO. Hence, while waiting for the pending IO operation to complete so that the required objects are in local memory for applying the changes, the Worker process can move onto other processing, rather than wait idly for the IO operation to complete. For example, while waiting for the pending IO operation to complete, the Worker process can work on reading, and/or ordering and/or applying work items associated with another data object. Once the IO completes, the Worker process can apply the work items to the data objects that were just provided to local memory.

Physical Standby Configuration

Figure 3B:
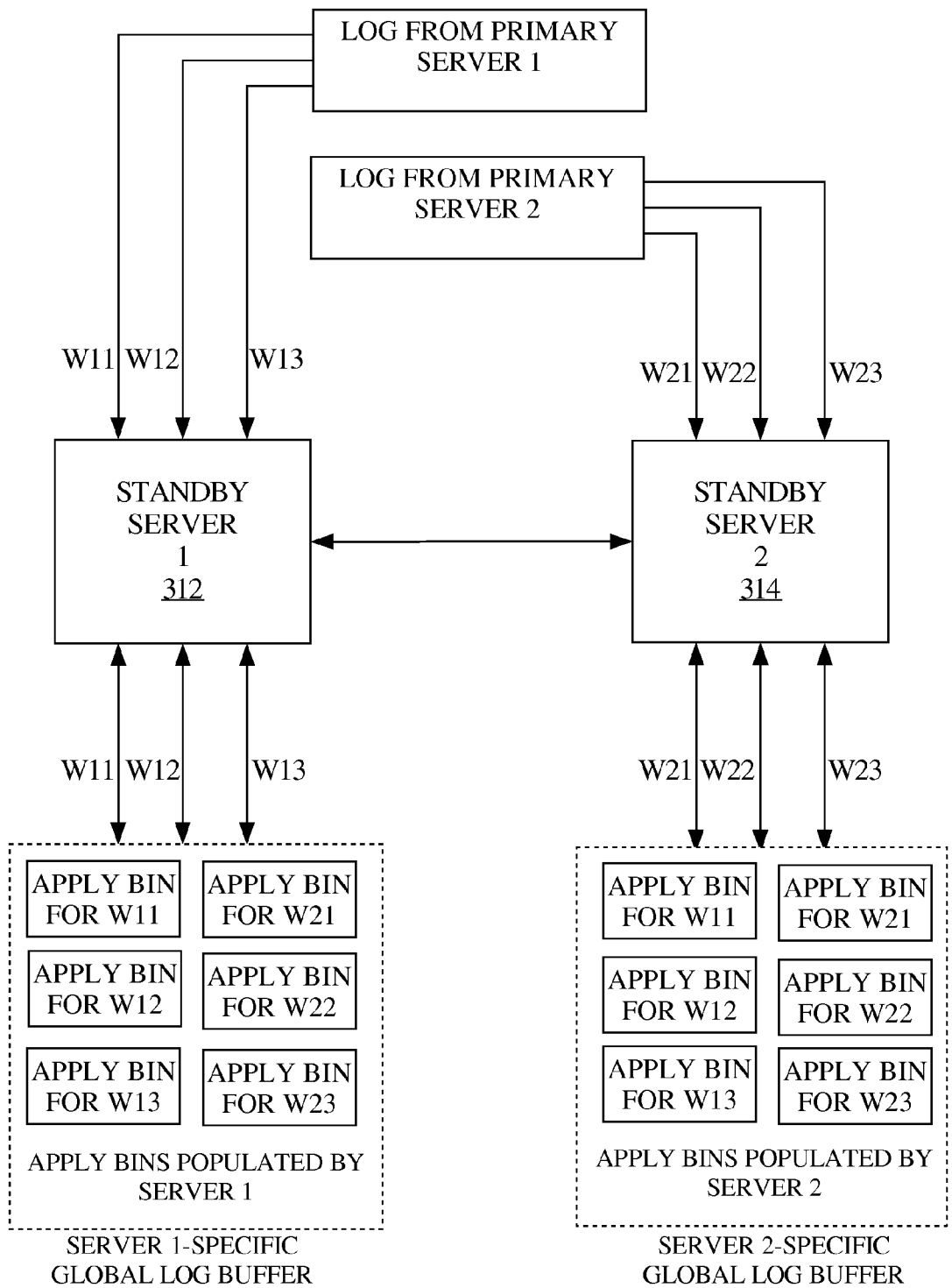
FIG. 3B is a block diagram that illustrates a system performing a method for processing sequences of work items from logs, according to an embodiment of the invention.

FIG. 3B is a block diagram that illustrates a system performing a method for processing sequences of work items from logs, according to an embodiment of the invention. FIG. 3B illustrates a different context than that illustrated in FIG. 3A, in which log-based processing may be performed. In FIG. 3B, two standby servers, standby server 1 (312) and standby server 2 (314), are each processing a log from an associated primary server, in order to replicate the state of the associated primary server. That is, the process described herein is used to update a standby database, i.e., a copy of a primary database, with changes that are made in the primary database.

For such a system, a method for processing a sequence of work items from a log is similar to the method illustrated in FIG. 2. Because, as depicted in FIG. 3B, there is a one-to-one relationship between each standby server and its related primary server, the log for a given primary server is read by only one standby server. If there were not a one-to-one relationship between primary and standby servers, such as in a system in which there are four primary database servers and only two standby database servers, a standby server may read logs from more than one primary server. However, in both scenarios, there are work items from logs from a primary server that may need to be applied by a standby server other than the standby server that actually read the log from the primary server. Thus, the need for and the ability of Worker processes at one server to send work items over to Worker processes at another server is still present.

Checkpointing the Process

As mentioned, a checkpointing process is commonly employed to limit the amount of rework in response to a failure. If the process described above fails for any reason, for example, due to a missing log or corrupt log, repeating the process from the beginning wastes resources. The goal is to minimize repeating any processing that has already been performed.

In comparison with other approaches, a more fluid checkpointing scheme is used that reduces the burdens of synchronization in parallel work processing. In one embodiment, the Coordinator process does not identify a future point of synchronization in the sequence of work items and require the Worker processes to get to that point and stop. Instead, the Coordinator examines the current state of progress of all the participating Worker processes and computes a past point in the sequence of work items at which all work items before that point have been processed, and persistently records this point as the checkpoint. Therefore, a global state of the process is maintained inexpensively in a distributed apply model without the need for synchronization messages back and forth between the Coordinator and the Workers.

Essentially, the same effect is achieved by simply recording the progress that has already been made by Worker processes, rather than predefining a common synchronization point for all the Worker processes to reach, which often requires some processes to wait idly for all of the other processes to reach that point. Consequently, a higher degree of resource utilization is achieved as the Worker processes continue working without stopping for checkpoint synchronization.

Each Worker maintains its current state of progress locally, which is periodically collected by the Coordinator, from which a global state is computed and recorded persistently. The global state is a global low watermark, which represents a common point in the work item apply process that each applying process has reached, i.e., a checkpoint. This checkpoint can be characterized by a SCN associated with the common sequence of work items. Hence, upon a failure of the process, it is known that no applying of work items before the checkpoint needs to be repeated. Furthermore, the Coordinator tracks high watermarks for each process, which represents the latest point in the sequence of work items that each Worker process has reached. Hence, upon a failure of the process, it is known from which point various Worker processes may need to be brought back to the checkpoint in order to bring all the Worker processes to a common point of applying.

The manner in which the Coordinator collects the states of the Worker processes may vary from implementation to implementation. In one embodiment, the Worker processes periodically push this information to the Coordinator. In addition, the Coordinator may periodically push the checkpoint to the Worker processes so that the Worker processes are aware of the global progress of the process.

Process Implementations

The log-based processing described herein is described primarily in the context of implementations for a database recovery process and a primary database-standby database synchronization process. However, these are not the only contexts in which the techniques may be implemented. For non-limiting examples, the techniques described herein are also applicable in the context of mirroring software and storage units. These types of systems also ship changes in logs to remote sites (although they may not be referred to explicitly as "logs"). Hence, the techniques may be used, for example, for keeping a remote filesystem synchronized with changes made at an original filesystem and keeping remote storage units synchronized with changes made in original storage units.

Hardware Overview

Figure 4:
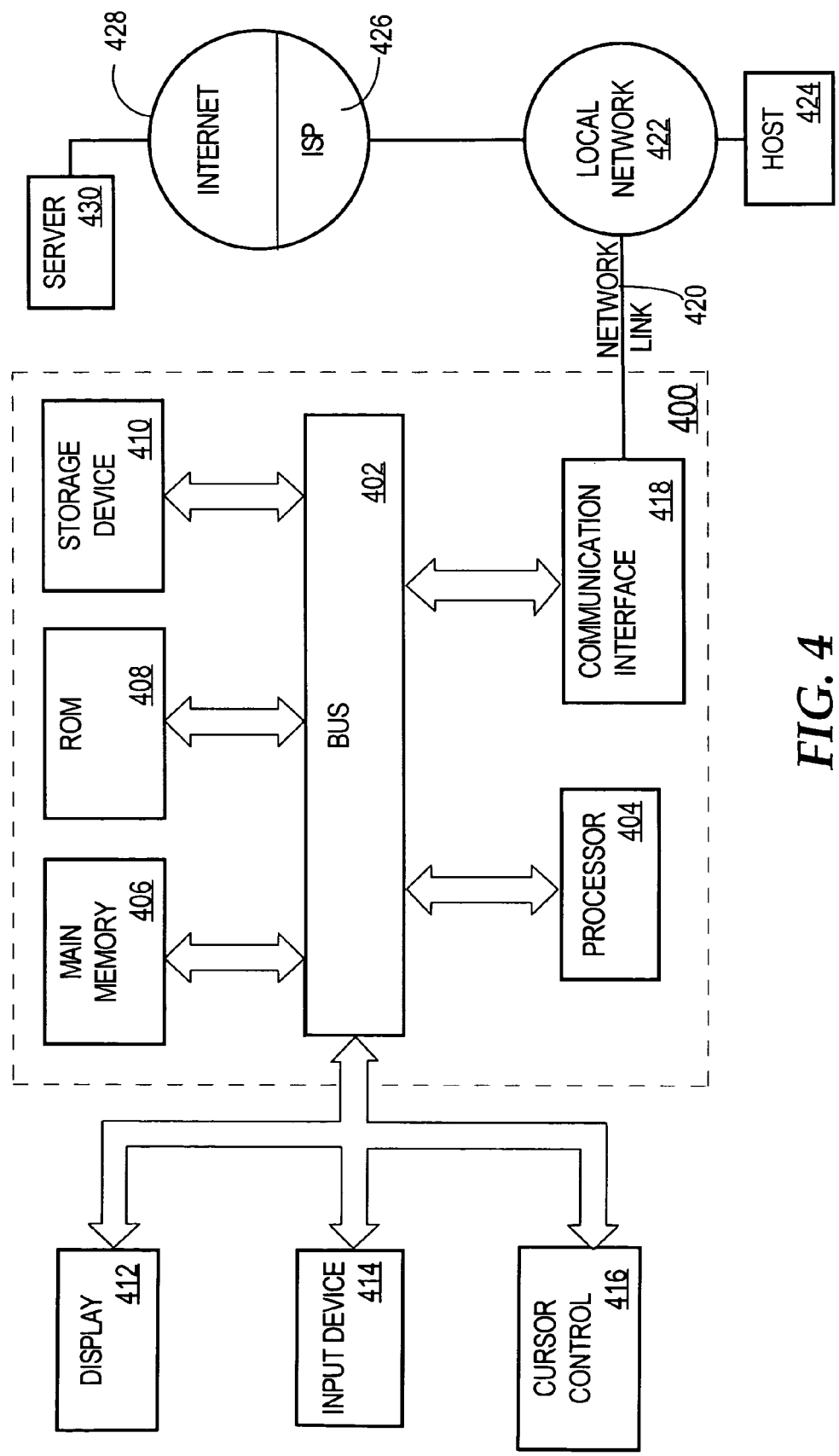
FIG. 4 is a block diagram that illustrates a computer system upon which an embodiment of the invention may be implemented.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk, optical disk, or magneto-optical disk, is provided and coupled to bus 402 for storing information and instructions.

Computer system 400 may be coupled via bus 402 to a display 412, such as a cathode ray tube (CRT) or a liquid crystal display (LCD), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical, magnetic, or magneto-optical disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

Extensions and Alternatives

In the foregoing description, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. Therefore, the specification and drawings are, accordingly, to be regarded in an illustrative rather than a restrictive sense.

In addition, in this description certain process steps are set forth in a particular order, and alphabetic and alphanumeric labels may be used to identify certain steps. Unless specifically stated in the description, embodiments of the invention are not necessarily limited to any particular order of carrying out such steps. In particular, the labels are used merely for convenient identification of steps, and are not intended to specify or require a particular order of carrying out such steps.

What is claimed is:

1. A method for processing sequences of work items from a log, wherein each work item in said log corresponds to a particular data object of a plurality of data objects, the method comprising computer-implemented steps of:
   each worker process of a plurality of worker processes producing a sequentially ordered set of work items of a plurality of sequentially ordered set of work items, wherein said sequentially ordered set of work items corresponds to a respective data object of said plurality of data objects, wherein producing a sequentially ordered set of work items of a plurality of sequentially ordered set of work items comprises:
      reading, from said log, a subset of the work items, said subset having a sequential log order;
      based on the respective data object for said each worker process, ordering work items in said sequentially ordered set of work items;
      wherein no work item in any other sequentially ordered set of work items of said plurality of sequentially ordered set of work items corresponds to respective one or more data objects of said sequentially ordered set of work items; and
      wherein the sequentially ordered set of work items is different than any other sequentially ordered set of work items of said plurality of sequentially ordered set of work items;
   wherein, each data object of said plurality of data objects corresponds to at least one work item of said plurality of sequentially ordered set of work items; and
   wherein the method is performed by one or more computer devices.

2. The method of claim 1, wherein the step of reading is performed by said each worker processes of said plurality of worker processes without partitioning of the work items by a coordinator process prior to the step of reading.

3. The method of claim 2, wherein the step of producing said sequentially ordered set of work items is performed by said each worker processes without receiving the subset of work items from the coordinator process.

4. The method of claim 1, wherein a set of worker processes includes said plurality of worker processes, wherein said log is a global log buffer, wherein the steps further include a first worker process of said set of worker processes adding one or more sequences of work items to said global log buffer.

5. The method of claim 4, wherein said plurality of processes includes said first worker process.

6. The method of claim 4, wherein said plurality of processes does not include said first worker process.

7. The method of claim 1, wherein the steps further include a set of worker processes applying said plurality of sequentially ordered work items to said plurality of data objects.

8. The method of claim 7, wherein the second worker process belongs to plurality of worker processes.

9. The method of claim 7, wherein said second worker process does not belong to said plurality of worker processes.

10. The method of claim 7, wherein each of the plurality of worker processes is associated with one of a plurality of servers that are communicatively interconnected, wherein each of the set of worker processes is associated with one of said plurality of servers, wherein the first worker process is associated with a first server of said plurality of servers, wherein the second worker process is associated with a second server of said plurality of servers, the method further comprising the computer-implemented step of the first worker process sending a first sequentially ordered set of work items for a corresponding data object to the second worker process, for applying the first sequentially ordered set of work items to a corresponding data object.

11. The method of claim 1, wherein each of the plurality of worker processes is associated with one of a plurality of servers that are communicatively interconnected, wherein the log comprises work items associated with at least two of the plurality of servers.

12. The method of claim 7, further comprising the computer-implemented steps of:
   by each of the set of worker processes, periodically providing to a coordinator process, an identifier of the most recent work item, from the log, that the worker process has applied;
   by the coordinator process,
      persistently storing a global checkpoint that identifies a particular location in the sequences of work items in the log, that all of the plurality of worker processes have reached in the step of applying work items to corresponding data objects, and
      periodically providing, to each of the set of worker processes, the global checkpoint.

13. The method of claim 12, further comprising the computer-implemented steps of:
   by the coordinator process, persistently storing the identifier of the most recent work item that each worker process of the set of worker processes has applied.

14. The method of claim 7, wherein applying comprises applying, by a first worker process of the set of worker processes, a first sequentially ordered set of work items of said plurality of sequentially ordered set of work items to a first data object and a second sequentially ordered set of work items of said plurality of sequentially ordered set of work items to a second data object, the method further comprising:
   by the first worker process,
      caching the first sequentially ordered set of work items into a cache accessible to the first worker process;
      while waiting for the first data object to be loaded from persistent storage into volatile memory accessible to the first worker process, applying the second sequentially ordered set of work items to the second data object; and
      once the first data object is loaded into the volatile memory accessible to the first worker process, then reading the first sequentially ordered set of work items from the cache, and
      applying the first sequentially ordered set of work items to the first data object in the volatile memory.

15. The method of claim 7, wherein the step of applying includes applying sequentially ordered sets of work items to corresponding data objects, one data object at a time in any order of data objects.

16. The method of claim 1, wherein the step of reading work items from said log includes
  reading, by a first set of worker processes of said plurality of worker processes, from said log; and
  reading, by a second set of worker processes that is different than the first set of said plurality of worker processes, from said log.

17. The method of claim 1, wherein the method for processing sequences of work items from said log is performed by a group of worker processes, wherein the plurality of worker processes are a subset of the group of worker processes, and wherein the steps of reading and producing are not performed by every worker process of the group of worker processes.

18. The method of claim 7, wherein the steps of reading, producing and applying are performed as part of a database recovery process performed in response to a failure of one or more database management servers.

19. The method of claim 7, wherein the steps of reading, producing and applying are performed as part of a database recovery process performed in response to corruption or loss of persistently stored data managed by one or more database management servers.

20. The method of claim 7, wherein the steps of reading, producing and applying are performed as part of a process of updating a copy of a database with changes made at a database from which the copy was derived.

21. The method of claim 7, wherein the steps of reading, producing and applying are performed as part of a process of updating a copy of a file system with changes made at a file system from which the copy was derived.

22. The method of claim 7, wherein the steps of reading, producing and applying are performed as part of a process of updating a copy of data stored on one or more storage units with changes made at one or more storage units from which the copy was derived.

23. A non-transitory computer-readable storage medium storing one or more sequences of instructions for processing sequences of work items from a log, which sequences of instructions, when executed by one or more processors, cause performance of steps comprising
  each worker process of a plurality of worker processes producing a sequentially ordered set of work items of a plurality of sequentially ordered set of work items, wherein said sequentially ordered set of work items corresponds to a respective data object of said plurality of data objects, wherein producing a sequentially ordered set of work items of a plurality of sequentially ordered set of work items comprises:
    reading, from said log, a subset of the work items, said subset having a sequential log order, wherein each work item in said subset of work items corresponds to a data object of said plurality of data objects;
    based on the respective one or more data object for said each worker process, ordering work items in said sequentially ordered set of work items;
    wherein no work item in any other sequentially ordered set of work items of said plurality of sequentially ordered set of work items corresponds to respective one or more data object of said sequentially ordered set of work items; and
    wherein the sequentially ordered set of work items is different than any other sequentially ordered set of work items of said plurality of sequentially ordered set of work items;
  wherein, each data object of said plurality of data objects corresponds to at least one work item of said plurality of sequentially ordered sets of work items; and
  wherein the method is performed by one or more computer devices.

24. The non-transitory computer-readable storage medium of claim 23, wherein the step of reading is performed by said each worker processes of said plurality of worker processes without partitioning of the work items by a coordinator process prior to the step of reading.

25. The non-transitory computer-readable storage medium of claim 24, wherein the step of producing said sequentially ordered set of work items is performed by said each worker processes without receiving the subset of work items from the coordinator process.

26. The non-transitory computer-readable storage medium of claim 23, wherein a set of worker processes includes said plurality of worker processes, wherein said log is a global log buffer, wherein the steps further include a first worker process of said set of worker processes adding one or more sequences of work items to said global log buffer.

27. The non-transitory computer-readable storage medium of claim 26, wherein said plurality of processes includes said first worker process.

28. The non-transitory computer-readable storage medium of claim 26, wherein said plurality of processes does not include said first worker process.

29. The non-transitory computer-readable storage medium of claim 23, wherein the steps further include a set of worker processes applying said plurality of sequentially ordered work items to said plurality of data objects.

30. The non-transitory computer-readable storage medium of claim 29, wherein the second worker process belongs to plurality of worker processes.

31. The non-transitory computer-readable storage medium of claim 29, wherein said second worker process does not belong to said plurality of worker processes.

32. The non-transitory computer-readable storage medium of claim 29, wherein each of the plurality of worker processes is associated with one of a plurality of servers that are communicatively interconnected, wherein each of the set of worker processes is associated with one of said plurality of servers, wherein the first worker process is associated with a first server of said plurality of servers, wherein the second worker process is associated with a second server of said plurality of servers, wherein the steps further comprise the first worker process sending a first sequentially ordered set of work items for a corresponding data object to the second worker process, for applying the first sequentially ordered set of work items to a corresponding data object.

33. The non-transitory computer-readable storage medium of claim 29, wherein each of the plurality of worker processes is associated with one of a plurality of servers that are communicatively interconnected, wherein the log comprises work items associated with at least two of the plurality of servers.

34. The non-transitory computer-readable storage medium of claim 29, the steps further comprising:
  by each of the set of worker processes, periodically providing to a coordinator process, an identifier of the most recent work item, from the log, that the worker process has applied;
  by the coordinator process,
    persistently storing a global checkpoint that identifies a particular location in the sequences of work items in the log, that all of the plurality of worker processes have reached in the step of applying work items to corresponding data objects, and periodically providing, to each of the set of worker processes, the global checkpoint.

35. The non-transitory computer-readable storage medium of claim 34, the steps further comprising:

by the coordinator process, persistently storing the identifier of the most recent work item that each worker process of the set of worker processes has applied.

36. The non-transitory computer-readable storage medium of claim 29, wherein applying comprises applying, by a first worker process of the set of worker processes, a first sequentially ordered set of work items of said plurality of sequentially ordered set of work items to a first data object and a second sequentially ordered set of work items of said plurality of sequentially ordered set of work items to a second data object, the steps further comprising:

by the first worker process, caching the first sequentially ordered set of work items into a cache accessible to the first worker process;

while waiting for the first data object to be loaded from persistent storage into volatile memory accessible to the first worker process, applying the second sequentially ordered set of work items to the second data object; and once the first data object is loaded into the volatile memory accessible to the first worker process, then reading the first sequentially ordered set of work items from the cache, and applying the first sequentially ordered set of work items to the first data object in the volatile memory.

37. The non-transitory computer-readable storage medium of claim 29, wherein the step of applying includes applying sequentially ordered sets of work items to corresponding data objects, one data object at a time in any order of data objects.

38. The non-transitory computer-readable storage medium of claim 23, wherein the step of reading work items from said log includes reading, by a first set of worker processes of said plurality of worker processes, from said log; and reading, by a second set of worker processes that is different than the first set of said plurality of worker processes, from said log.

39. The non-transitory computer-readable storage medium of claim 23, wherein the non-transitory computer-readable storage medium for processing sequences of work items from said log is performed by a group of worker processes, wherein the plurality of worker processes are a subset of the group of worker processes, and wherein the steps of reading and producing are not performed by every worker process of the group of worker processes.

40. The non-transitory computer-readable storage medium of claim 23, wherein a worker process of said plurality of worker processes produces said one or more sequentially ordered sets of work items based, at least in part, on work items that were read from said log, by worker processes from said plurality of worker processes other than said worker process.

41. The non-transitory computer-readable storage medium of claim 23 wherein the log is one of a plurality of logs from which said plurality of worker processes read said work items.

42. The method of claim 1, wherein at least two work items correspond to a particular data object of said plurality of data objects, wherein a particular sequentially ordered set of work items of said plurality of ordered sets of work items corresponds to said particular data object and contains said at least two work items, wherein a relative order of said at least work items in said subset of work items differs from the relative order of said at least work items in said particular sequentially ordered set of work items.

43. The non-transitory computer-readable storage medium of claim 23, wherein at least two work items correspond to a particular data object of said plurality of data objects, wherein a particular sequentially ordered set of work items of said plurality of ordered sets of work items corresponds to said particular data object and contains said at least two work items, wherein a relative order of said at least work items in said subset of work items differs from the relative order of said at least work items in said particular sequentially ordered set of work items.

44. The non-transitory computer-readable storage medium of claim 32, wherein the steps of reading, producing and applying are performed as part of a database recovery process performed in response to a failure of one or more database management servers.

45. The non-transitory computer-readable storage medium of claim 29, wherein the steps of reading, producing and applying are performed as part of a database recovery process performed in response to corruption or loss of persistently stored data managed by one or more database management servers.

46. The non-transitory computer-readable storage medium of claim 29, wherein the steps of reading, producing and applying are performed as part of a process of updating a copy of a database with changes made at a database from which the copy was derived.

47. The non-transitory computer-readable storage medium of claim 29, wherein the steps of reading, producing and applying are performed as part of a process of updating a copy of a file system with changes made at the database from which the copy was derived.

48. The non-transitory computer-readable storage medium of claim 29, wherein the steps of reading, producing and applying are performed as part of a process of updating a copy of a file system with changes made at the file system from which the copy was derived.

49. The non-transitory computer-readable storage medium of claim 29, wherein a worker process of said plurality of worker processes produces said one or more sequentially ordered sets of work items based, at least in part, on work items that were read from said log, by worker processes from said plurality of worker processes other than said worker process.

50. The non-transitory computer-readable storage medium of claim 29 wherein the log is one of a plurality of logs from which said plurality of worker processes read said work items.

* * * * *

UNITED STATES PATENT AND TRADEMARK OFFICE
CERTIFICATE OF CORRECTION

| | | |
|---|---|---|
| PATENT NO. | : 8,566,326 B2 | Page 1 of 1 |
| APPLICATION NO. | : 10/982135 | |
| DATED | : October 22, 2013 | |
| INVENTOR(S) | : Hu et al. | |

It is certified that error appears in the above-identified patent and that said Letters Patent is hereby corrected as shown below:

On the title page, under item [75], delete "Yemeni," and insert -- Yerneni, --, therefor.

On title page 2, column 1, under item [56], line 13, delete "l0g" and insert -- 10g --, therefor.

Signed and Sealed this
Eighth Day of July, 2014

Michelle K. Lee
*Deputy Director of the United States Patent and Trademark Office*